United States Patent [19]

Mizuno et al.

[11] Patent Number: 4,731,390
[45] Date of Patent: Mar. 15, 1988

[54] BIAXIALLY STRETCHED POLYPARAPHENYLENE SULFIDE FILM

[75] Inventors: Toshiya Mizuno, Tsuchiura; Satoshi Hirose, Iwaki; Yoshikichi Teramoto, Tsuchiura, all of Japan

[73] Assignee: Kureha Kagaku Kogyo Kabushiki Kaisha, Tokyo, Japan

[21] Appl. No.: 32,571

[22] Filed: Apr. 1, 1987

[30] Foreign Application Priority Data

Apr. 2, 1986 [JP] Japan ................................ 61-75827

[51] Int. Cl.$^4$ ............................................. C08V 9/00
[52] U.S. Cl. ...................................... 521/134; 264/41; 264/210.7; 264/288.4; 521/180; 525/189
[58] Field of Search ................. 521/134, 180; 525/189

[56] References Cited

U.S. PATENT DOCUMENTS 4,045,382  8/1977  Braese et al. ........................ 521/134
4,111,860  9/1978  Jack ..................................... 521/134

Primary Examiner—Morton Foelak
Attorney, Agent, or Firm—Oblon, Fisher, Spivak, McClelland & Maier

[57] ABSTRACT

Disclosed herein is a biaxially stretched polyparaphenylene sulfide film comprising a resin composition consisting essentially of 100 parts by weight of a resin of polyparaphenylene sulfide series and from 0.3 to 15 parts by weight of poly(4-methylpentene-1).

5 Claims, 2 Drawing Figures

BIAXIALLY STRETCHED POLYPARAPHENYLENE SULFIDE FILM

BACKGROUND OF THE INVENTION

The present invention relates to a biaxially stretched polyparaphenylene sulfide film which is excellent in slip properties and oil-impregnation property, and more in detail, the present invention relates to a biaxially stretched polyparaphenylene sulfide film comprising a resin composition prepared by mixing from 0.3 to 15 parts by weight of poly(4-methylpentene-1) with 100 parts by weight of a resin of polyparaphenylene sulfide series.

As the industrial films (engineering plastic film), although polyethylene terephthalate films, polypropylene films, polyimide films, etc. have been exemplified, they are not sufficient as the film which can be formed by melt-processing, is excellent in various properties such as heat-resistance and is cheap in the production cost.

On the other hand, the resin of polyphenylene sulfide series (hereinafter, referred to as PPS) is excellent in heat-resistance and chemical-resistance, and has been used for various uses as a material for incombustible films.

In the case where PPS films are used as a capacitor film or a base film for magnetic tape, by adding an inorganic filler, for instance, silica, carbon, glass, kaoline, calcium carbonate and calcium phosphate to PPS resin, the oil-impregnation property of the film is improved and a PPS film in which the running property of the tape is improved is produced.

However, in the case of the industrial production of the film of which the oil-impregnation property and the running property of the tape have been improved by adding the inorganic filler to PPS resin, various technical problems are caused.

For instance, the thus added inorganic filler forms protuberances on the surface of the thus produced film. Furthermore, since the affinity between the inorganic filler and the PPS resin is poor and the inorganic filler itself coagulates in the PPS resin, the inorganic filler comes off from the film to be white powder during the running in the production of the film and during the use of the film as a magnetic film or during the production of a capacitor, extremely inconvenient situations are caused in the industrial processes for producing the goods in the case of using the inorganic filler.

Further, although the content of the inorganic filler in the base film for the magnetic tape is relatively small to PPS resin, since it has been well known that the performance of the film as the magnetic tape is lowered in the case where the unevenness of the surface of the film caused by the inorganic filler is too severe, the solution of the problem how to make the surface of the film flat and smooth while maintaining the properties of the film, such as the running property has been demanded.

On mixing the inorganic filler with PPS resin, there is a tendency that the electric specificity of the film, namely the electrical breakdown strength thereof is reduced. Furthermore, there may be cases where the dielectric loss (tan δ) of the film is raised by the water-absorption of the thus mixed inorganic filler. Since the dielectric loss is raised by using a relatively large amount of the inorganic filler, the increase of the dielectric loss causes the self-generation of heat in the capacitor film resulting in the destruction of the capacitor and therefore, the solution of the problem of suppressing the increase of the dielectric loss has also been demanded.

On the other hand, the PPS film prepared without adding the inorganic filler has the defects of poor in the running property and also poor in the oil-impregnation property.

Accordingly, an offer of a biaxially stretched PPS film, which is excellent in the slipping properties, the running property and the oil-impregnation property and does not contain the inorganic filler, has been earnestly desired.

As a result of the present inventors' studies, it has been found out by the present inventors that the biaxially stretched film produced from the resin composition prepared by blending poly(4-methylpentene-1) with a resin of polyparaphenylene sulfide series has the excellent running property and the excellent oil-impregnation property, is excellent in the flatness and is low in dielectric loss, and on the basis of the finding, the present invention has been attained.

SUMMARY OF THE INVENTION

In an aspect of the present invention, there is provided a biaxially stretched polyparaphenylene sulfide film comprising a resin composition consisting essentially of 100 parts by weight of a resin of polyparaphenylene sulfide) series and from 0.3 to 15 parts by weight of poly(4-methylpentene-1).

The object of the present invention is provided with the biaxially stretched polyparaphenylene sulfide film which is flat, has both the slipping properties and the oil-impregnation property and is low in the dielectric loss which is the cause of exothermism of the capacitor, while solving the problems of the running property and the oil-impregnation property of the biaxially stretched polyparaphenylene sulfide film.

BRIEF DESCRIPTION OF THE DRAWINGS

Of the attached drawings.

DETAILED DESCRIPTION OF THE INVENTION

Figure 1:
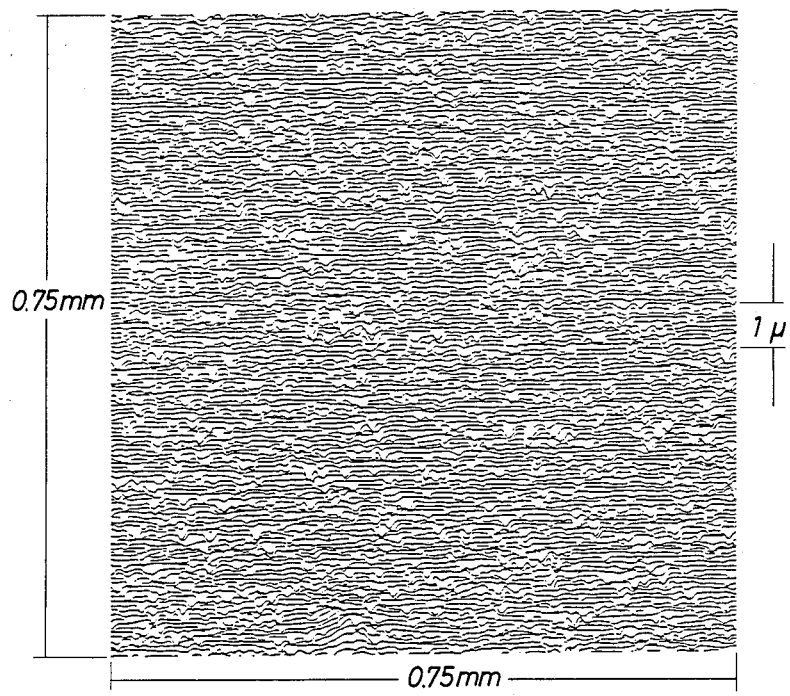
FIG. 1 shows a roughness figure of the three-dimensional surface of the film of Example 1 measured by a surface microtopography and measuring instrument (made by TOKYO-SEIMITSU CO., LTD., SURFCOM, Model 550)

As PPS resin according to the present invention, a homopolymer of paraphenylene sulfide and a copolymer mainly composed of the paraphenylene sulfide unit may be exemplified. As the unit other than the paraphenylene sulfide unit:

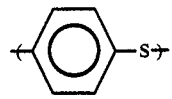

of the copolymer, metaphenylene sulfide unit:

p,p'-diphenylenesulfone sulfide unit:

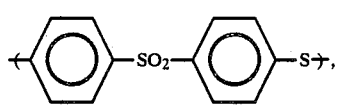

p,p'-diphenylene sulfide unit:

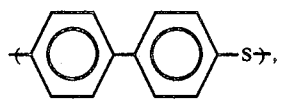

p,p'-diphenylene ether sulfide unit:

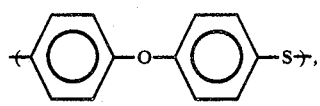

etc. may be mentioned. Particularly, as PPS resin according to the present invention a block-copolymer of paraphenylene sulfide composed of the paraphenylene sulfide units and the metaphenylene sulfide units is preferable.

The homopolymer of paraphenylene sulfide according to the present invention may be produced by the conventional method, however, it is preferable that the homopolymer is linear and has a high molecular weight, and the homopolymer is produced by, for instance, the following methods.

(1) The process for producing a poly(arylene sulfide) of a high molecular weight, comprises the steps of reacting an alkali metal sulfide with a dihaloaromatic compound in a solvent of an organic amide in the presence of from 0.5 to 2.4 mol of water to 1 mol of the alkali metal sulfide at a temperature of from 180° to 235° C., thereby forming a poly(arylene sulfide) of a melt viscosity of from 5 to 300 poise in a conversion rate of the dihaloaromatic compound of from 50 to 98 mol, and after adding water so that from 2.5 to 7.0 mol of water is present to 1 mol of the alkali metal sulfide, further carrying out the reaction at a temperature of from 245° to 290° C. [refer to Japanese patent application Liad-Open (KOKAI) No. 61-7332 (1986) (corresponding to U.S. patent application No. 746252 filed on June 18, 1985 and European patent application No. 85107575.4)].

(2) The process for producing a poly(paraphenylene sulfide), comprises the steps of contacting at least one sulfur source, at least one p-dihalobenzene, at least one organic amide, at least one base and at least one alkali metal carbonate represented by the formula: RCOOM (wherein R represents a hydrocarbyl group and M represents an alkali metal), thereby forming a composition, and maintaining the composition at polymerization conditions of a temperature of from 235° to 450° C. for from about 10 min to 72 hours to polymerize the composition [refer to Japanese Patent Publication No. 52-12240 (1977) (corresponding to U.S. Pat. No. 3919177 and British Pat. No. 1477726)].

Furthermore, as the block-copolymer consisting essentially of the paraphenylene sulfide unit and the metaphenylene sulfide unit, for instance, the block-copolymer consisting essentially of the recurring unit (A):

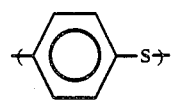

and the recurring unit (B):

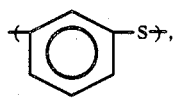

wherein the recurring unit (A) is present in the form of a block of from 20 to 5000 units on average thereof in a molecular chain of the block-copolymer, the molar fraction of the recurring unit (A) of the block-copolymer is in the range of from 0.50 to 0.98, the melt-viscosity ($\eta^*$) of the block-copolymer measured under the conditions of 310° C. at a shearing rate of 200 sec$^{-1}$ is from 50 to 100,000 poise, the glass-transition temperature of the block-copolymer is from 20° to 80° C. and the crystalline melting point of the block-copolymer is from 250° to 285° C. may be exemplified. Such a block-copolymer is obtained by the following methods.

(I) The method comprises the steps of heating a non-proton-polar organic solvent containing p-dihalobenzene and an alkali metal sulfide, thereby forming a reaction liquid (C) containing a paraphenylene sulfide polymer wherein an average polymerization degree of the recurring unit (A):

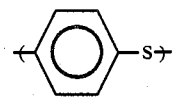

is from 20 to 5000, adding a dihaloaromatic compound substantially composed of m-dihalobenzene to the thus formed reaction liquid (C) and heating the thus prepared mixture in the presence of an alkali metal sulfide and a non-proton-polar organic solvent, thereby forming the block-copolymer of paraphenylene sulfide consisting essentially of the block of the recurring unit (A) and the recurring unit (B):

and having the molar fraction of the recurring unit (A) of from 0.50 to 0.98, the melt viscosity ($\eta^*$) of from 50 to 100,000 poise (measured under the condition of the shearing rate of 200 sec$^{-1}$ at 310° C.), the glass transition temperature (Tm) of from 20° to 80° C. and the crystalline melting point (Tm) of from 250° to 285° C.

(II) The method comprises the steps of heating a non-proton-polar organic solvent containing a dihaloaromatic compound composed of m-dihalobenzene and an alkali metal sulfide, thereby forming a reaction liquid (E) containing a metaphenylene sulfide polymer composed of the recurring unit (B):

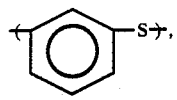

having an average polymerization degree of not less than 2 and in the range of $$\left(20 \times \frac{1-Y}{Y}\right) \text{ to } \left(5000 \times \frac{1-Y}{Y}\right),$$

wherein Y is the molar fraction of the recurring unit (A) of the thus formed block-copolymer, namely, in the range of from 0.50 to 0.98, adding p-dihalobenzene to the reaction liquid (E) and heating the thus prepared mixture in the presence of an alkali metal sulfide and a non-proton-polar organic solvent, thereby forming the block copolymer of paraphenylene sulfide consisting essentially of the recurring unit (B):

and the recurring unit (A):

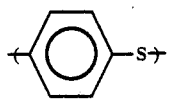

and having the molar fraction of the recurring unit (A) of from 0.50 to 0.98, the melt viscosity ($\eta^*$) of from 50 to 100,000 poise (measured under the condition of the shearing rate of 200 sec$^{-1}$ at 310° C.), the glass transition temperature (Tm) of from 20° to 80° C. and the crystalline melting point of from 250° to 285° C. [refer to Japanese Patent Application Laid-Open (KOKAI) No. 61-14228 (1986)(corresponding to U.S. patent application No. 748464 filed on June 25, 1985 and European patent application No. 85108037.4)].

The poly(4-methylpentene-1) used in the present invention is a polymer having a melt flow rate of not more than 100 (at 260° C., unit: g/10 min), preferably from 0.3 to 70, more preferably from 5 to 40. Such a poly(4-methylpentene-1) shows a crystalline melting point of 235° C. (refer to "Plastic" Vol. 33, No. 7, pp 70-71, 1984), namely a high crystalline melting point as compared to the ordinary polyolefins, and is a polyolefin having a branched structure. Furthermore, such a poly(4-methylpentene-1) of the present invention shows a small dielectric loss (tan $\delta$) and is excellent in electrical breakdown strength. The heart of the present invention lies in a film prepared from the composition obtained by blending such a poly(4-methylpentene-1) having the specified properties as above as compared to the ordinary polyolefin with PPS resin.

Further, in the case where the melt flow rate of poly(4-methylpentene-1) is more than 100, the dispersibility thereof into PPS is poor and accordingly it is difficult to produce the film in which poly(4-methylpentene-1) has been uniformly dispersed. Accordingly, the melt-flow rate of more than 100 is not preferable.

The compounding ratio of poly(4-methylpentene-1) to 100 parts by weight of PPS resin is from 0.3 to 15 parts by weight, preferably from 0.3 to 5 parts by weight. In the case of less than 0.3 part by weight, the improvement of the sliding property and the oil-impregnation property is scarcely recognized. On the other hand, in the case of more than 15 parts by weight, the heat-resistance and meltprocessability both of which are the specified properties of PPS resin are deteriorated.

The production of the biaxially stretched film according to the present invention can be effected by a publicly known process. For instance, (1) after uniformly blending the starting materials in a mixing machine such as a tumbler and a henschel mixer, the mixed material is supplied to an extruder to be melted and kneaded, and after molding the thus kneaded material into a film-form or sheet-form from a T-die attached to an extruder, the thus obtained film or sheet is chilled rapidly to obtain an amorphous film or sheet, or (2) after uniformly blending the starting materials in a mixing machine such as a tumbler and a henschel mixer, the mixed material is supplied to an extruder to be melted and kneaded, and after pelleting the thus kneaded material and molding the thus obtained pellets into a film-form or sheet-form from a T-die provided with an extruder, the thus obtained film or sheet is chilled rapidly to obtain an amorphous film or sheet.

The chilling treatment is preferably carried out at a cooling speed of not less than 10° C./sec. The thus obtained amorphous transparent film or sheet is biaxially stretched simultaneously or successively by a roller method or a tenter method at a temperature of from 80° to 120° C.

The stretching ratio is preferably from 2 to 5 times both in the machine direction and the transverse direction.

The thus stretched film or sheet is heat-set at a temperature of from 200° to 280° C. under a tension. The time of the heat-set treatment depends on the physical properties required to the product, however, the time of the heat-set treatment is not less than 3 sec and not more than several tens of minutes, preferably from 3 to 600 sec. By such a heat-set treatment for from 3 sec to several tens of minutes, the crystallization thereof proceeds and as a result, the thermally stabilized film or sheet can be obtained.

The biaxially stretched film or sheet obtained by using PPS resin composition to which poly(4-methylpentene-1) has been mixed is flat and has an excellent sliding property, a kinetic friction coefficient between the thus obtained films or sheets at a temperature of 20° C. and RH of 70% of not more than 0.6, preferably not more than 0.45, and a center-line average roughness (Ra) of the film or sheet of from 0.02 to 0.5 $\mu$m. The kinetic friction coefficient is measured according to the method of ASTM-D-1894, and the center-line average roughness (Ra) is measured by a surface roughness meter (made by TOKYO SEIMITSU Co., Ltd., SURF-COM, Model 550) according to Japanese Industrial Standards (JIS) B 0601.

Furthermore, the thus obtained biaxially stretched film or sheet is favorable in the oil-impregnation property and is low in the dielectric loss, and accordingly, it is suitable for use in the capacitor and the magnetic tape.

Further, the PPS film containing poly(4-methylpentene-1) of from 0.3 to 5 parts by weight has the minute hollows of not more than 10 $\mu$m on an average diameter on the surface of the film in numbers of not less than $10^2/mm^2$, preferably not less than $10^3/mm^2$ and is suitable for use in the magnetic tape of a large magnetic recording density.

In a biaxially stretched film comprising a resin composition of PPS resin and an inorganic filler or a polymer, etc., there are many cases where the protuberances are formed on the surface of the film. As compared with the above-mentioned biaxially stretched film, in the case where the biaxially stretched film according to the present invention, which has only the minute hollows and has the same center-line average roughness (Ra) as the biaxially stretched film comprising PPS resin and an inorganic filler and having the protuberance, is used as the magnetic tape, the degree of close adherence of the film to the magnetic head is favorable, and the biaxially stretched film according to the present invention is suitable as the base film for the magnetic tape having the high magnetic recording density.

Although the reason why the surface having the minute hollows is obtained in the case of using poly(4-methylpentene-1) is still unknown, it is considered that the compatibility between PPS resin and poly(4-methylpentene-1) is concerned therewith.

The biaxially stretched PPS film according to the present invention may contain a suitable stabilizer, a suitable filler, etc. to the extent of not spoiling the object of the present invention.

The biaxially stretched PPS film according to the present invention has a kinetic friction coefficient of not more than 0.6, preferably not more than 0.45 at a temperature of 20° C. and RH of 70% and a center-line average roughness (Ra) of preferably from 0.02 to 0.5 μm, has both the flatness and the slipping properties, and shows a smaller dielectric loss than that of the biaxially stretched film comprising PPS resin and an inorganic filler, and the biaxially stretched PPS film according to the present invention is suitable as the film for the capacitor and the magnetic tape.

Particularly, the biaxially stretched PPS film according to the present invention containing a small amount of poly(4-methylpentene-1) has the minute hollows of an average diameter of not more than 10 μm in number of not less than $10^2/mm^2$, preferably not less than $10^3/mm^2$ on the surface thereof, and is suitable as the film for the magnetic tape having a high magnetic recording density.

The present invention will be explained more in detail while referring to the non-limitative Examples as follows.

EXAMPLE 1

Into an autoclave of a capacity of 20 liters, 8.0 kg of N-methylpyrrolidone (hereinafter referred to as NMP) and 20.0 mol of sodium sulfide pentahydrate ($Na_2S.5H_2O$) were introduced, and the content of the autoclave was heated to about 200° C., thereby the moisture was distilled (the loss of sulfur discharged as $H_2S$ was 1.4 mol % of the introduced amount of sodium sulfide pentahydrate and the amount of moisture in the autoclave was 27 mol). Thereafter, 20.1 mol of p-dichlorobenzene (hereinafter referred to as p-DCB) and 3.1 kg of NMP were introduced into the autoclave, and after substituting the aerial space of the autoclave with nitrogen gas, the content of the autoclave was subjected to polymerization for 10 hours at 210° C., and after adding 53 mol of water, the content was subjected to reaction for 5 hours at 260° C. After the reaction was over, the liquid reaction mixture was subjected to filtration and the thus collected precipitate was washed with hot water and dried under a reduced pressure to obtain poly(p-phenylene sulfide), which showed the melt viscosity of 3200 poise at 310° C. and a shearing rate of 200 $sec^{-1}$.

In a Henschel mixer, 100 parts by weight of the thus obtained poly(p-phenylene sulfide) and 0.6 part by weight of poly(4-methylpentene-1) [made by MITSUI Petrochem. Co., Ltd., of a melt flow rate of 22 g/10 min at 260° C. and 5 kg (hereinafter referred to as the melt flow rate of 22)]were blended, and the thus blended material was extruded into a rod of about 2 mm in diameter by an extruder maintained at 310° C. and then the rod was pelletized. The thus obtained pellets were crystallized by retaining for 2 hours at 150° C. The thus crystallized pellets were extruded into a sheet-form by an extruder provided with a T-die to obtain a sheet of a thickness of about 200 μm. The thus obtained sheet was simultaneously and biaxially stretched at a stretching ratio of 3.5×3.5 times by a biaxial stretching machine (made by T. M. Long Co.) at 105° C. The thus obtained, stretched film was fixed in all periphery thereof onto a metal frame and subjected to thermal treatment (heat-set treatment) for 5 min in a gear-oven at 260° C.

The center-line average roughness (Ra) of the thus obtained film was 0.044 μm, and as a result of observing the surface of the thus obtained film by the surface microtopography and measuring instrument (made by TOKYO-SEIMITSU Co., Ltd. SURFCOM, Model 550), the figure shown in FIG. 1 was obtained.

As are seen in FIG. 1, the average diameter of the minute hollows of the film obtained in Example 1 is about 8 μm and the film has minute hollows of about $1400/mm^2$. Furthermore, the kinetic friction coefficient of the film was 0.35 as a result of measurement by a friction tester (made by TOYO SEIKI Works, Ltd., model TR) according to the method of ASTM D-1894. The contact angle after 2 min of dropping cumyl-phenylethane (an impregnating oil for capacitor, made by KUREHA Chem. Ind. Co., Ltd., KIS-1000) at 20° C. was 4°, and the processability of the film at the time of rolling up the film was extremely favorable.

COMPARATIVE EXAMPLE 1

In the same manner as in Example 1 except for mixing no poly(4-methylpentene-1) with PPS resin, a biaxially stretched poly(p-phenylene sulfide) film was obtained.

Figure 2:
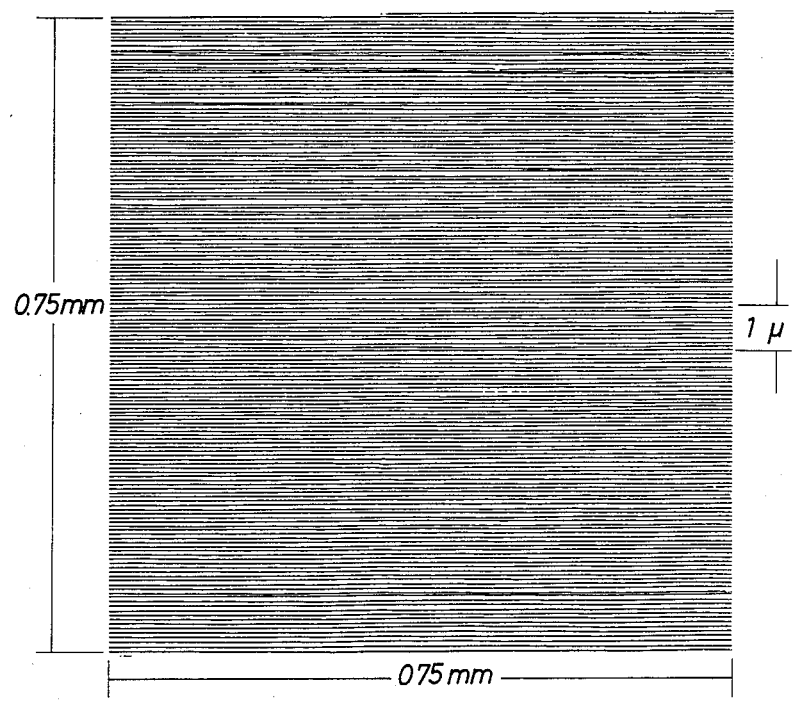
FIG. 2 shows a roughness figure of the three-dimensional surface of the film of Comparative Example.

The center-line average roughness (Ra) of the thus obtained film was 0.017 μm and the figure of the surface of the thus obtained film by the three dimensional surface roughness meter is shown in FIG. 2. No minute hollows were recognized on the surface of the film from FIG. 2. Further, the kinetic friction coefficient of the film was 3.0.

EXAMPLE 2

Into an autoclave of a capacity of 20 liters, 8.0 kg of NMP (N-methylpyrrolidone) and 21.0 mol of sodium sulfide pentahydrate ($Na_2S.5H_2O$) were introduced, and by heating the content of the autoclave to about 204° C., the moisture was distilled out (loss of sulfur was 2.7 mol % and the moisture was 26.4 mol). Thereafter, 19.8 mol of m-dichlorobenzene (m-DCB) and 3.12 kg of NMP were introduced further into the autoclave (the calculated concentration of sodium sulfide in the mixture was 1.343 mol/kg), and after substituting the aerial space of the autoclave with nitrogen gas, the content was subjected to polymerization for 2 hours at 220° C. and further subjected to reaction for 8 hours at 230° C., thereby obtaining a liquid reaction mixture(hereinafter referred to as "A" liquid), and the "A" liquid was drawn out from the autoclave and preserved.

After sampling a small amount of the "A" liquid, the specimen was measured for the polymerization degree of the thus formed prepolymer of m-phenylene sulfide according to the GPC method. The polymerization degree of the prepolymer was 30.

Separately, into an autoclave of 20 liters, 7.0 kg of NMP and 17.0 mol of sodium sulfide pentahydrate (Na$_2$S.5H$_2$O) were introduced, and by heating the content of the autoclave to about 200° C., the moisture was distilled out (loss of sulfur was 2.7 mol % and the moisture was 18.3 mol). Thereafter, 16.87 mol of p-dichlorobenzene (hereinafter referred to as p-DCB), 6.51 mol of water, 2.38 kg of NMP and 2.174 kg of the "A" liquid were further introduced into the autoclave, and after substituting the aerial space of the autoclave with nitrogen gas, the content was subjected to reaction for 10 hours at 210° C. and after adding 1.24 kg of water into the autoclave, the content was subjected to reaction for 5 hours at 260° C.

After the reaction was over, the liquid reaction mixture was subjected to filtration and the thus collected precipitate was washed with hot water and dried under a reduced pressure to recover the block-copolymer.

On measuring the molar fraction of the recurring unit:

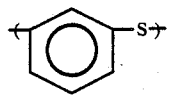

belonging to the block by the infrared analysis, the molar fraction thereof was 0.15.

The melt viscosity ($\eta^*$) of the block-copolymer measured under the conditions of 310° C. and a shearing rate of 200 sec$^{-1}$ by using a KOKA-type flow-tester was 3700 poise.

With 100 parts by weight of the thus obtained block-copolymer of p-phenylene sulfide and m-phenylene sulfide, 7 parts by weight of poly(4-methylpentene-1) (made by MITSUI Petrochem. Co., Ltd., of a melt-flow rate of 26 at 260° C. under a load of 5 kg) were blended, and in the same manner as in Example 1, a sheet of a thickness of about 200 $\mu$m was prepared.

The thus obtained sheet was subjected to simultaneous biaxial stretching of a stretching ratio of 3.5×3.5 times by a biaxially stretching machine (made by T. M. Long Co.) at 95° C. After fixing the thus obtained, stretched film onto a metal frame in all periphery, the film was subjected to thermal treatment (heat-set treatment) for 5 min in an gear-oven at 260° C.

The center-line average roughness (Ra) of the thus obtained film was 0.30 $\mu$m, and the kinetic friction coefficient of the film was 0.3. Furthermore, the figure of the surface of the film observed by the three dimensional surface roughness meter was the same as in FIG. 1.

The contact angle after 2 min of dropping cumylphenylethane (an impregnation oil for capacitor) at room temperature was 3°. On the other hand, the contact angle of the film of polyparaphenylene sulfide of Comparative Example 1 was 8° under the same conditions as above.

Furthermore, the processability of the film obtained in Example 2 at the time of rolling up thereof was favorable.

EXAMPLE 3

In the same manner as in Example 2, a block-copolymer of p-phenylene sulfide and m-phenylene sulfide was produced.

With 100 parts by weight of the thus obtained block-copolymer of p-phenylene sulfide and m-phenylene sulfide, 0.5 part by weight of poly(4-methylpentene-1) (made by MITSUI Petrochem. Co., Ltd., of a melt flow rate of 22 at 260° C. under a load of 5 kg) was blended in a Henschel mixer, and after pelletizing the thus blended material in the same manner as in Example 2, the thus obtained pellets were transformed into a biaxially stretched film of a thickness of about 20 $\mu$m.

After fixing the thus obtained, biaxially stretched film onto a metal frame in all periphery, the film was subjected to thermal treatment (heat-set treatment) for 5 min in a gear-oven at 250° C.

The center-line average roughness (Ra) of the thus obtained, biaxially stretched film was 0.035 $\mu$m.

Furthermore, the three dimensional surface roughness of the thus obtained, biaxially stretched film showed the same pattern as that in FIG. 1. From the thus obtained pattern, it was found that the film had about 2000 minute hollows of an average diameter of 5 $\mu$m per mm$^2$ on the surface thereof. The kinetic friction coefficient of the film was 0.40, and the contact angle thereof was 4°.

What is claimed is:

1. A biaxially stretched polyparaphenylene sulfide film comprising a resin composition consisting essentially of 100 parts by weight of a resin of polyparaphenylene sulfide and from 0.3 to 15 parts by weight of poly(4-methylpentene-1).

2. A biaxially stretched polyparaphenylene sulfide film according to claim 1, which has a kinetic friction coefficient between said films of not more than 0.6 at a temperature of 20° C. and RH of 70%, and a center-line average roughness (Ra) of said film of from 0.02 to 0.5 $\mu$m.

3. A biaxially stretched polyparaphenylene sulfide film according to claim 1, wherein the melt flow rate of said poly(4-methylpentene-1) is not more than 100 g/10 min at 260° C.

4. A biaxially stretched polyparaphenylene sulfide film according to claim 1, wherein the amount of said poly(4-methylpentene-1) is from 0.3 to 5 parts by weight to 100 parts by weight of said resin of polyparaphenylene sulfide, said film having minute hollows of an average diameter of not more than 10 $\mu$m in number of not less than 10$^2$/mm$^2$ of the surface.

5. A biaxially stretched polyparaphenylene sulfide film according to claim 1, wherein said resin of polyparaphenylene sulfide is a homopolymer of paraphenylene sulfide or a copolymer composed of paraphenylene sulfide unit and metaphenylene sulfide unit.

* * * * *